April 23, 1940.  J. F. TARPLEY, JR  2,197,815
INTEGRATOR FOR DETERMINING THE COMBINED EFFECT OF
INFLOW INTO AND OUTFLOW FROM RESERVOIRS
Filed Dec. 23, 1936  2 Sheets-Sheet 1

INVENTOR
J. F. Tarpley, Jr.
BY HIS
Adam Richmond
ATTORNEY.

April 23, 1940.  J. F. TARPLEY, JR  2,197,815
INTEGRATOR FOR DETERMINING THE COMBINED EFFECT OF
INFLOW INTO AND OUTFLOW FROM RESERVOIRS
Filed Dec. 23, 1936  2 Sheets-Sheet 2

INVENTOR
J. F. Tarpley, Jr.
BY HIS
ATTORNEY.

Patented Apr. 23, 1940

2,197,815

UNITED STATES PATENT OFFICE 2,197,815

INTEGRATOR FOR DETERMINING THE COMBINED EFFECT OF INFLOW INTO AND OUTFLOW FROM RESERVOIRS

Jesse F. Tarpley, Jr., Washington, D. C.

Application December 23, 1936, Serial No. 117,332

4 Claims. (Cl. 235—61)

(Granted under the act of March 3, 1883, as amended April 30, 1928; 370 O. G. 757)

This invention described herein, if patented, may be manufactured and used by or for the Government for governmental purposes, without the payment to me of any royalty thereon.

This invention relates to an integrator for determining the combined effect of inflow into and outflow from reservoirs.

The main object of this invention is to provide a device for determining the rate of discharge from a reservoir at all times during the period of time under consideration, which would result from any assumed method of operation under any assumed condition of inflow into the reservoir.

Another object of the invention is to provide a device for determining the elevation of the water surface in the reservoir at all times during the period of time under consideration under the same conditions assumed in the preceding paragraph.

Figure 1:
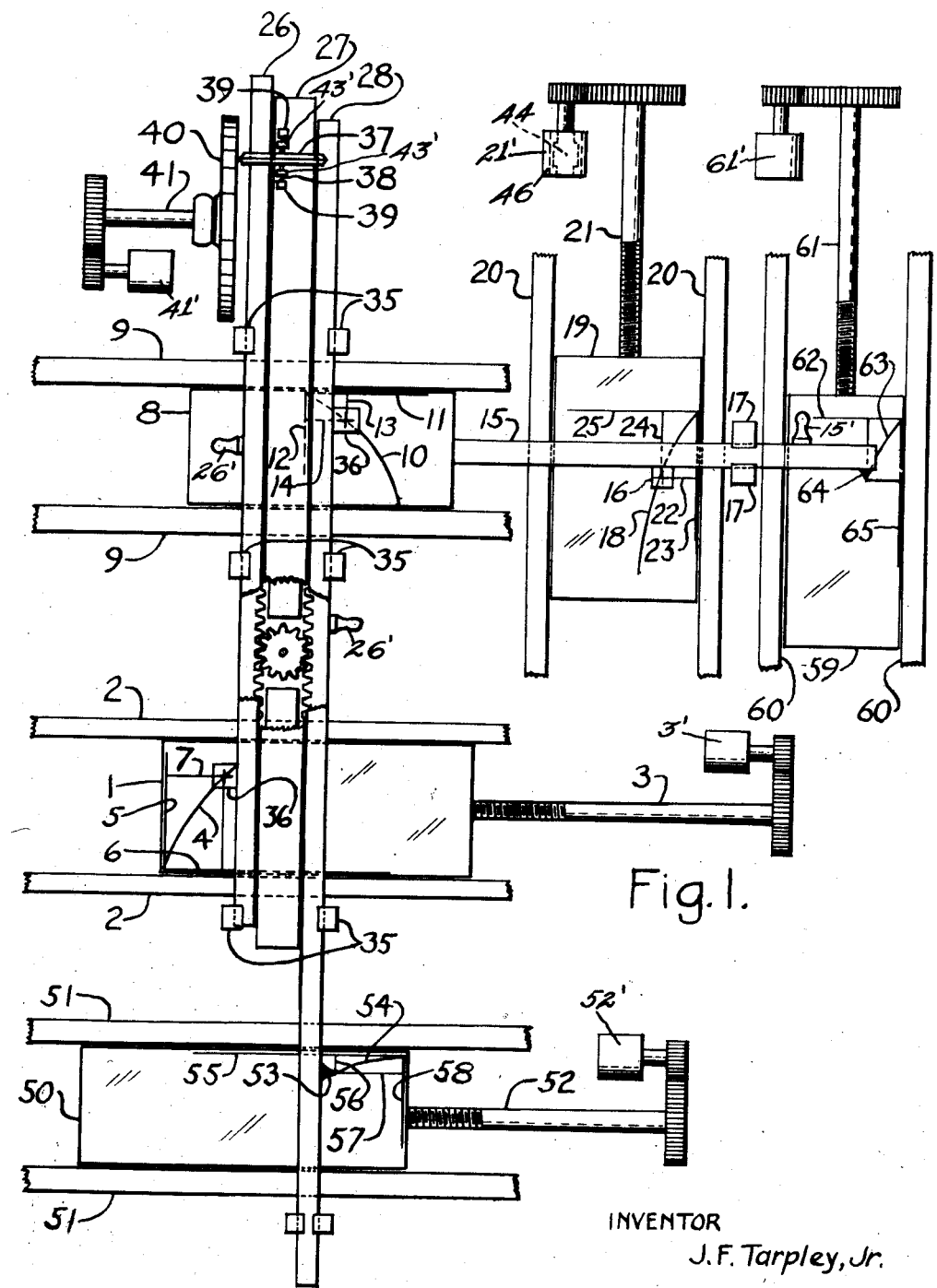
Figure 2:
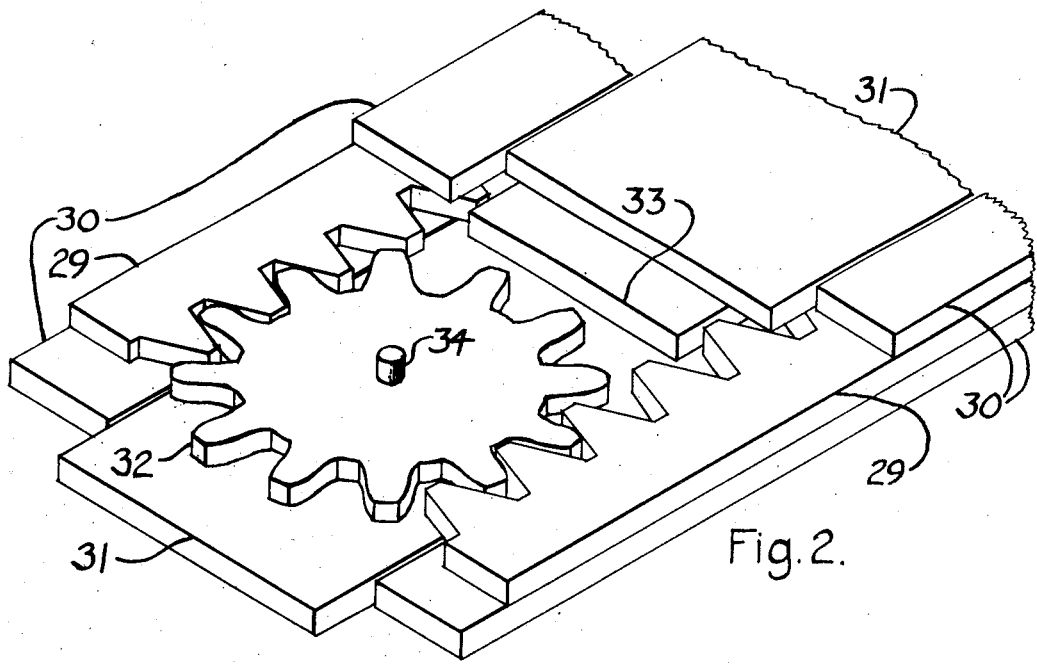
Figure 3:
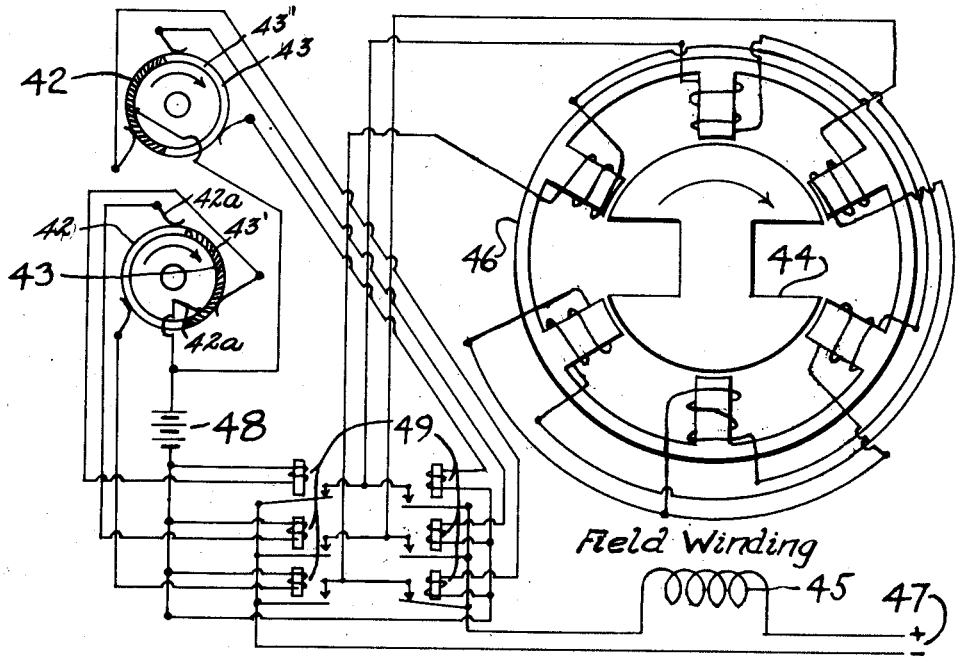

Referring to the drawings Figure 1 is a diagrammatic plan view of the device. Figure 2 is an enlarged isometric view of a part of the integrating slides. Figure 3 is a diagrammatic sketch of one method of reproducing the direction and rate of rotation of the integrating disc in a motor which drives the shaft which moves the panel on which the reservoir capacity curve is mounted.

Referring in detail to the drawings, 1 is a panel adapted to support a hydrograph of actual inflow into the reservoir or of any assumed inflow conditions. The curve 4 on the hydrograph is drawn in such a manner that the ordinate of any point on curve 4, measured upward from the axis of time 6, represents the rate of inflow into the reservoir, in units of volume per unit of time, at the time represented by the abscissa 7. Panel 1 is moved in a direction parallel to axis of time 6 between guides 2 by means of threaded shaft 3 which is revolved at a predetermined number of revolutions per unit of time, by the motor 3' so that the time required for panel 1 to move through a distance corresponding to one unit of time as measured along the time axis 6, will be one sixtieth or one one-hundred and twentieth or any other preselected fractional part of the actual passage of time.

8 is a panel, similar to panel 1 but on which is mounted a rating curve 10, which is drawn in such a manner that the ordinate 13 of any point on the curve, measured downward from the axis of water surface elevation 11 in the reservoir, represents the outflow from the reservoir in the same unit of volume per unit of time and to the same scale as for curve 4 on panel 1, corresponding to the water surface elevation in units of length above an assumed datum plane as measured by abscissa 14, from the axis of outflow 12. Panel 8 is moved between guides 9 in a direction parallel to axis of water surface elevation 11, by means of arm 15 attached to panel 8. Arm 15 slides in guides 17 and is adapted to be manually adjusted so that the cross on index 16, attached to arm 15, will be directly over a point on curve 18, (corresponding to an assumed rate of inflow).

19 is a panel on which is mounted a capacity curve 18, so drawn that ordinate 22, of any point on curve 18, measured from the axis of volume of water in storage 23, represents the water surface elevation in the same unit of length and to the same scale as for curve 10 on panel 8 above the assumed datum plane referred to hereinabove, and abscissa 24 of the point, measured from axis of water surface elevation, 25 represents the volume of water, in units of volume, when the water surface elevation is as represented by ordinate 22. Panel 19 is moved in a direction parallel to the axis of volume 23 between guides 20 by means of a motor 21' geared to threaded shaft 21, in such a manner that the distance panel 19, moves measured along the axis of volume of water in storage, during a given period of time, equals the increase or decrease of the volume of water in storage effected during said given period of time. The method of accomplishing the above mentioned movement of panel 19, will be explained after the remaining parts have been described.

26, 27 and 28 are the slides forming a part of the integrating mechanism, and are shown assembled with the other parts of the device in Figure 1 and in a sectional isometric view, to an enlarged scale, in Figure 2.

26 and 28 consist essentially of racks 29. To facilitate the relative movement of slides 26 27 and 28 plain bars 30, are riveted, bolted, welded or otherwise rigidly attached to racks 29, with the teeth of the rack projecting beyond the edges of the plain bars 30.

27 consists of top and bottom bars 31, rigidly attached to a middle bar 33, in such a manner as to provide a recess along each side of 27, in which the projecting portions of the teeth of racks 29 of slides 26 and 28, can slide permitting a close sliding fit between top and bottom bars 31 of slide 27 and the corresponding bars of slides 26 and 28. As shown in Fig. 1 of the drawings, a sufficient length of middle bar 33, of slide 27 is omitted to provide space for gear, 32, which rotates about pin, 34, which in turn is firmly attached to top and bottom bars 31, of slide 27.

When mounted and assembled as shown in Figure 1 and in more detail, in Figure 2, if upward motion is considered to be positive and downward motion to be negative, then for any movement of slide 26 or slide 28, or both, the resulting movement of slide 27, will be one-half of the algebraic sum of the distance or distances through which slide 26 or slide 28 or both, are moved.

Slides 26 and 28, with differential slide 27, mounted between them with gear 32, meshing with racks 29 slide as a unit between guides 35 are adapted to move across panels, 1 and 8, in a direction at right angles to the direction of movement of the panels.

Indices 36 are mounted, with provision for adjustment on slides 26 and 28. The indices 36, may consist of a small square, rectangle or other shape of glass with a cross marked thereon or any other suitable mark, pointer or other device to enable the operator of the device to move slides 26 and 28, so as to keep the crosses, pointers or other marks of the indices 36 directly over the curves mounted on panels, 1 and 8, respectively.

37 is a circular integrating disc rigidly attached to shaft, 38, which rotates in bearings, 39, which are rigidly attached to slide, 27.

40 is a larger disc revolving in a plane parallel to a plane which includes the axis of shaft 38. As disc 40 revolves at a constant predetermined number of revolutions per unit of time, disc 37 when held in contact with the face of disc 40, will rotate at a varying number of revolutions per unit of time which at any time will equal the number of revolutions per unit of time of disc 40, multiplied by the distance from the center of disc 40 to the point of contact of disc 37, on disc 40; divided by the radius of disc 37. Disc 40 is driven by shaft 41, which is connected by means of suitable gears to a motor 41' of constant speed.

Bearing 39, on which are mounted disc 37 and its shaft 38, are so located on slide 27, that the point of contact between discs 37 and 40, will be exactly on the center of the latter when the index 36 of slide 26 is exactly over a point on curve 4 on panel 1, where the inflow into the reservoir is zero and the index 36 on slide 28 is exactly over a point on curve 10 on panel 8, where the discharge from the reservoir is zero. When the indices 36 on slides 26 and 28 are adjusted to the above described condition and slides 26 and 28 are moved up and down respectively so that the indices on the slides are directly over other points on curves 4 on panel 1, and 10 on panel 8, corresponding to rates of inflow an discharge assumed to be in effect at any time, slide 27 and disc 37, which is mounted thereon will, due to its differential mounting between slides 26 and 28, move up or down, depending on whether the rate of assumed inflow is greater or less than the assumed rate of outflow, through a distance equal to one-half of the difference between the distances moved by slides 26 and 28. Disc 37 will therefore revolve at a number of revolutions per unit of time which will be in a fixed ratio to the numerical value of the net rate of gain or loss of water in storage in the reservoir, and its direction of rotation will be in one direction if there is a gain in storage and in the opposite direction if there is a loss in storage. Since the rate of rotation of disc 37, bears a fixed ratio to the rate of net inflow into or outflow from the reservoir and its direction of rotation is in one direction if the inflow is greater than the outflow and in the oppposite direction if outflow exceeds inflow, the number of revolutions made by disc 37 in one direction minus the number made in the opposite direction during any period of time under consideration is directly proportional to the increase or decrease of the volume of water in storage in the reservoir which was effected during such period of time.

Hereinbefore it is stated that the distance moved by panel 19 measured along the axis of volume 23 during a given period of time equals the increase or decrease of the volume of water in storage during a given period of time, and that the method of accomplishing such movement of panel 19 would be described later. Such movement of panel 19 will be accomplished by connecting threaded shaft 21 through suitable gears to a motor whose direction of rotation will correspond to that of disc 37, and whose rate of rotation will be equal to or have a fixed relation to that of disc 37. Figure 3 illustrates one method whereby the motor which drives shaft 21, will rotate in the same direction and at the same rate of rotation as disc 37. 42 and 43 are segments of a commutator 43' mounted on shaft 38, which revolves with disc 37. Each segment must extend at least 120 degrees and not more than 180 degrees measured around the circumference of the commutator. 44 is the revolving field of the motor which drives shaft 21 through suitable gears or speed reducers. 46 is the stationary armature of the motor. 45 represents the field winding of motor 21'. It is shown in Figure 3 as in series with the stationary armature circuits but may be shunt or compound wound.

47 represents the source of power for driving the motor 21'. 48 represents the battery or other source of power for the control circuits. 49 represents six relays, each of which is connected to a suitable brush 42a. Brushes 42a are adapted to be associated with the commutators on shaft 38 in such a manner that when the commutator revolves in either direction the relays are operated by the control circuit through successive contacts of the brushes with the commutator segments. The relays in turn close and open the circuits of the stationary armature 46, causing the revolving field 44 of the motor to advance one-sixth of a revolution for each one-sixth of a revolution of the commutator on shaft 38 with rotation in the same direction as that of shaft 38.

50 is a panel which slides between guides 51, and is moved from left to right by motor 52' geared to threaded shaft 52, which is driven at a predetermined number of revolutions per unit of time such that panel 50 will move at the same velocity as panel 1.

53 is a marker mounted on slide 28 in such a manner that it will record curve 54 as panel 50 is moved from left to right and slide 28 up or down with the cross of index 36, following the curve 10 on panel 8.

Curve 54 is one of the desired results of the operation of the device and referred to axis of time 55, and axis of discharge 58 provides a record of the discharge from the reservoir in units of volume per unit of time, at all times during the period of time represented by the length of the axis of time 55—that is, for any point on curve 54 the ordinate 56 represents the discharge from the reservoir in units of volume per unit of time at the time represented by abscissa 57.

59 is a panel sliding between guides 60, and is moved upward by means of motor 61' geared to threaded shaft 61, in exactly the same manner as panel 50, described hereinbefore.

64 is a marker mounted on arm 15 in such a manner that it will record curve 63 as panel 59 moves upward, and as arm 15 is adjusted to the right or to the left as the operator follows curve 18 on panel 19 with index 16, as will be understood without further discussion.

Curve 63 is one of the desired results of the operation of the device and when referred to axis of time 65 and axis of water surface elevation 62 provides a record of the elevation of the water surface in the reservoir at all times during the period of time under consideration.

This movement may be accomplished by direct movement of said slides and arm, by knobs or handles 15' and 26' attached to said arm, as shown in Fig. 1 of the drawings.

The charts described as being mounted on panels 1, 8 and 19 may be drawn to the selected scales on paper or card-board and inserted in fixed positions on the panels and may be held in place by guides or clips or other suitable means.

The chart described as being mounted on panel 8 may have several curves drawn thereon, each representing the discharge curve for a different condition of the outlet works of the reservoir. In such case the curves should be distinguished from each other by being drawn in different colors in different combinations of dots and dashes. This will permit the solution of problems in which the condition of the outlet works of the reservoir may be changed by opening or closing sluice gates, valves, wickets or other elements of the outlet works. In such case the operator will keep the index on slide 28 over the curve corresponding to the assumed condition of the outlet works until such condition is changed. He will then move the slide until the index is over the curve corresponding to the changed condition of the outlet works. As many such changes as may be desired may be made during the period of time under consideration and the results plotted on the charts on panels 50 and 59, by the scribes on slide 28, and arm 15 will reflect the effect of all such changes as are made.

Assuming motors 41', 21', 61', 3' and 52' to be in operation and the crosses 36 connected with slides 26 and 28 adjusted with respect to points of assumed inflow and outflow on curves 4 and 10, respectively, of panels 1 and 8 and the cross 16 of arm 15, adjusted with respect to the capacity curve 18 on panel 19. As panel 50 is moved a given distance in a given unit of time between its guides, marker 53 on slide 28 will describe a curve by means of which the rate of discharge from the reservoir in units of volume per unit of time may be determined. As the marker 53 and panel 50 record the rate of discharge, marker 64 carried by arm 15 and guided along capacity curve 18, will describe a curve upon the chart carried by panel 59 to provide a record of the elevation of the water surface in the reservoir during the period under consideration.

Having described my invention, what I claim as new and wish to secure by Letters Patent is:

1. An integrating apparatus comprising movably mounted primary, secondary and tertiary surfaces, means to move said primary surface a predetermined distance in a unit of time, means in connection with and controlling the movement of said secondary surface, said means being adjustable with reference to points on the tertiary surface, an integrating mechanism, means to vary the output of the said integrating mechanism, said means including indices adjustable with respect to points on said primary and secondary surfaces, and means to effect actuation of said tertiary surface, said means being controlled by the output of the integrating mechanism.

2. An integrating apparatus comprising movably mounted primary, secondary and tertiary surfaces, electro-mechanical means to move said primary surface a predetermined distance in a unit of time, manually operated means in connection with and controlling the movement of said secondary surface, said means being adjustable with reference to points on the tertiary surface, an integrating mechanism, means to vary the output of said integrating mechanism, said means including indices adjustable with respect to points on said primary and secondary surfaces and means to effect actuation of said tertiary surface, said means being controlled by the output of the integrating mechanism.

3. An integrating apparatus comprising movably mounted primary, secondary and tertiary surfaces, electro-mechanical means to move said primary surface a predetermined distance in a unit of time, manually operated means in connection with and controlling the movement of said secondary surface, said means being adjustable with reference to points on the tertiary surface, an integrating mechanism, means to vary the output of said mechanism, said means including a differential, the output of which controls that of the integrating mechanism, and a pair of indices adjustable with reference to points on said primary and secondary surfaces, the adjustment of said indices controlling the differential output and means to effect actuation of said tertiary surface, said means being controlled by the output of the integrating mechanism.

4. An integrating apparatus comprising movably mounted primary, secondary and tertiary surfaces, manually operated means in connection with and controlling the movement of said secondary surface, said means being adjustable with reference to points on the tertiary surface, an integrating mechanism, means to vary the output of said integrating mechanism, said means including a pair of indices, supporting members for said indices, said members being relatively adjustable to position said indices with reference to points on said primary and secondary surfaces, an extension carried by one of said indices-supporting members, a marker on said extension, an additional surface in operative relation with respect to said marker, electro-mechanical means to move said primary and said additional surfaces a predetermined distance in a unit of time, and electro-mechanical means to effect actuation of said tertiary surface, said means being controlled by the output of the integrating mechanism.

JESSE F. TARPLEY, Jr.